United States Patent [19]

Suzuki et al.

[11] Patent Number: 5,424,005

[45] Date of Patent: Jun. 13, 1995

[54] LIQUID CRYSTAL COMPOUNDS

[75] Inventors: Yoshiichi Suzuki; Hiroyuki Mogamiya; Ichiro Kawamrua, all of Tokyo, Japan

[73] Assignee: Showa Shell Sekiyu K.K., Tokyo, Japan

[21] Appl. No.: 906,470

[22] Filed: Jun. 30, 1992

Related U.S. Application Data

[63] Continuation-in-part of Ser. No. 875,609, Apr. 29, 1992, Pat. No. 5,204,020, which is a continuation of Ser. No. 305,127, Feb. 2, 1989, abandoned.

[30] Foreign Application Priority Data

Feb. 2, 1988 [JP] Japan ................... 63-21159
Feb. 2, 1988 [JP] Japan ................... 63-21160

[51] Int. Cl.$^6$ .................. C09K 19/12; C07C 69/76
[52] U.S. Cl. ................. 252/299.650; 560/102; 252/299.66
[58] Field of Search ............ 252/299.65, 299.66; 560/102

[56] References Cited

U.S. PATENT DOCUMENTS

| | | | |
|---|---|---|---|
| 4,917,817 | 4/1990 | Nohira et al. | 252/299.01 |
| 4,917,821 | 4/1990 | Mori et al. | 252/299.63 |
| 4,918,213 | 4/1990 | Nohira et al. | 558/271 |
| 4,921,632 | 5/1990 | Nakamura et al. | 252/299.1 |
| 4,973,978 | 11/1990 | Suzuki et al. | 560/80 |
| 5,167,861 | 12/1992 | Suzuki et al. | 252/299.65 |
| 5,184,847 | 2/1993 | Suzuki et al. | 252/299.65 |

FOREIGN PATENT DOCUMENTS 294852 12/1988 European Pat. Off. .
2-160748 6/1990 Japan .
WO8707890 12/1987 WIPO .

OTHER PUBLICATIONS

H. Tanguchi et al, "Electrical and optical Properties of Florinated Ferroelectric liquid Crystal", Japanese Journal of Applied Physics, vol. 26, Part 1, Supplement 26-2, 1987, pp. 101–103.

K. Yoshino et al, "Florinated Ferroelectric Liquid Crystal and its Dielectric Property", Chemistry Express, vol. 2, No. 1, 1987, pp. 53–56.

Primary Examiner—Robert L. Stoll
Assistant Examiner—C. Harris
Attorney, Agent, or Firm—Sughrue, Mion, Zinn, Macpeak & Seas

[57] ABSTRACT

A composition of (R)-isomer and (S)-isomer of a liquid crystal compound represented by the formula;

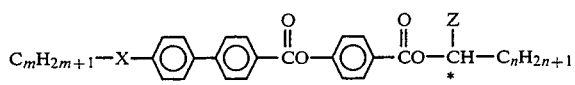

wherein X represents —O— or a direct bond, Z represents a halogen-substituted alkyl group selected from a group consisting of —$CF_3$, —$CHF_2$, —$CH_2F$, —$C_2F_5$, —$CClF_2$, —$CCl_2F$, —$CCl_2CF_3$, and —$C_3F_7$, m represents an integer of from 1 to 20, n represents an integer of from 1 to 20, and * represents an asymmetric carbon, and the optical purity of said composition is high enough to exhibit optically tristable states in S*(3) phase when electric voltage is applied.

5 Claims, 9 Drawing Sheets

SYSTEM FOR MEASUREMENT OF ELECTROOPTICAL PROPERTIES (R)-ISOMER 100
(S)-ISOMER 0

(R)-ISOMER 90
(S)-ISOMER 10

(R)-ISOMER 80
(S)-ISOMER 20

(R)-ISOMER 70
(S)-ISOMER 30

(R)-ISOMER 60
(S)-ISOMER 40

(R)-ISOMER 50
(S)-ISOMER 50

APPLIED TRIANGULAR WAVE

OPTICAL RESPONSE OF COMMERCIALLY AVAILABLE NEMATIC LIQUID CRYSTAL

OPTICAL RESPONSE OF CONVENTIONAL BISTABLE LIQUID CRYSTAL

OPTICAL RESPONSE OF TRISTABLE LIQUID CRYSTAL

LIQUID CRYSTAL COMPOUNDS

This is a continuation in part application of Ser. No. 07/875,609, U.S. Pat. No. 5,204,020, filed on Apr. 29, 1992 which is a continuation application of Ser. No. 07/305,127 abandoned, filed on Feb. 2, 1989.

The present invention relates to ferroelectric or high dielectric, chiral smectic liquid crystal compounds for a display element or an electrooptical element, utilizing the particular property that the molecular orientation thereof can be controlled in an electric field. Furthermore, the present invention relates to antiferroelectric liquid crystal compounds having tristable molecular orientations in S*(3) phase for an indicative element or a photo-electric element utilizing response to an electric field.

The liquid crystal display element has been widely used for various purposes due to desired properties thereof such as low electric tension workability, low electric energy consumption, displayability in a thin form, and light recepting type causing less eyestrain.

A liquid crystal display device of twisted nematic (TN) type is, however, not satisfactory in that the speed of response is too slow in comparison with display devices of light emitting type such as a cathode ray tube (CRT), so that the use thereof is rather restricted for that purpose.

As an improvement of said property of such nematic liquid crystals, R. B. Meyer et al succeeded in the year of 1975 in synthesis of decylooxybenzylideneamino-2-methylbutyl cinamates (DOBAMBC) as a ferroelectric liquid crystal. In the year of 1980, Clark and Lagawall found and confirmed a high speed switching property in the order of a microsecond of the DOBAMBC thin film cell.

These ferroelectric chiral smectic liquid crystals have a high speed response about 100 times as fast as that of the conventional nematic ones as well as good bistability, so that the crystals are expected for an application to display devices for moving pictures such as TV, high speed photoshutters and so on.

It is necessary for the ferroelectric liquid crystal to have spontaneous polarization which is inversible by an electric field, chiral molecular structure, particular smectic layer and a dipole moment component in the vertical direction to the line of apsides of the liquid crystal molecule.

Followings have been known regarding how to make molecular designs in order to obtain liquid crystals having not only high dielectricity but also large spontaneous polarization.

(1) Since rotation of liquid crystal molecule about the line of apsides may reduce efficient orientation degree of dipole moment so that spontaneous polarization is made smaller, it is effective to suppress the molecular free rotation. To this effect, it is possible to introduce a bulky atomic or molecular group in the vicinity of an asymmetric carbon atom.

(2) A direct method for obtaining large spontaneous polarization is introducing large dipole moment to the vicinity of the asymmetric carbon atom. Alternatively, an atomic or molecular group of fluorine such as $CF_3$ is directly introduced at the asymmetric carbon atom.

In the accompanying drawings.

The present invention provides novel liquid crystal compounds which are used for liquid crystal electro-optical devices employing tristable liquid crystals. The devices are able to show stable molecular orientation which expresses clear contrast in a field where no electric voltage is applied to, clear threshold and clear hysteresis as in FIG. 3. The devices are also ready to allow dynamic drive and make it possible to respond at high speed.

Figure 1:
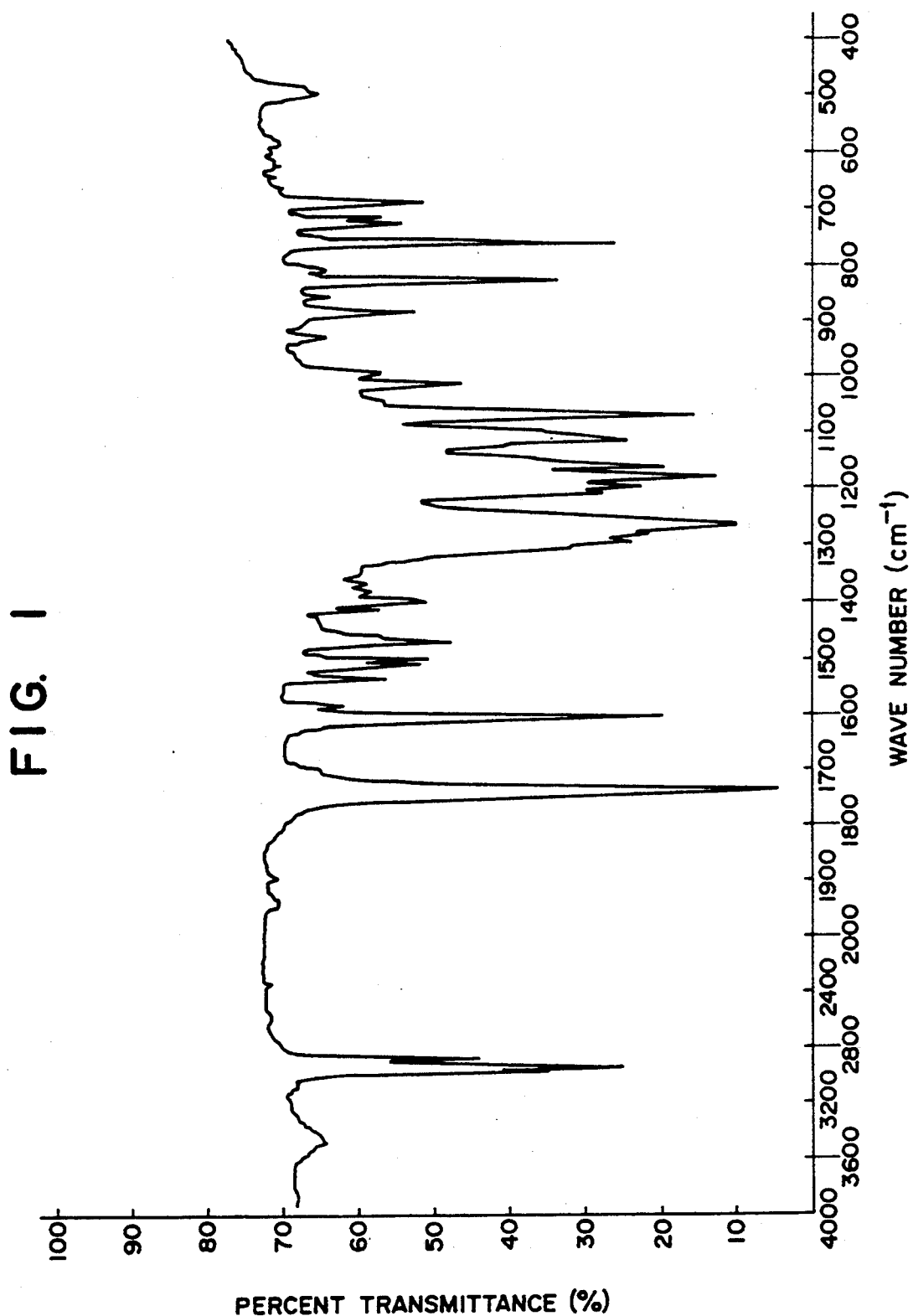
FIGS. 1-5 show the infrared spectra of the compounds according to the present invention in Examples 1-5, respectively.
Figure 8A:
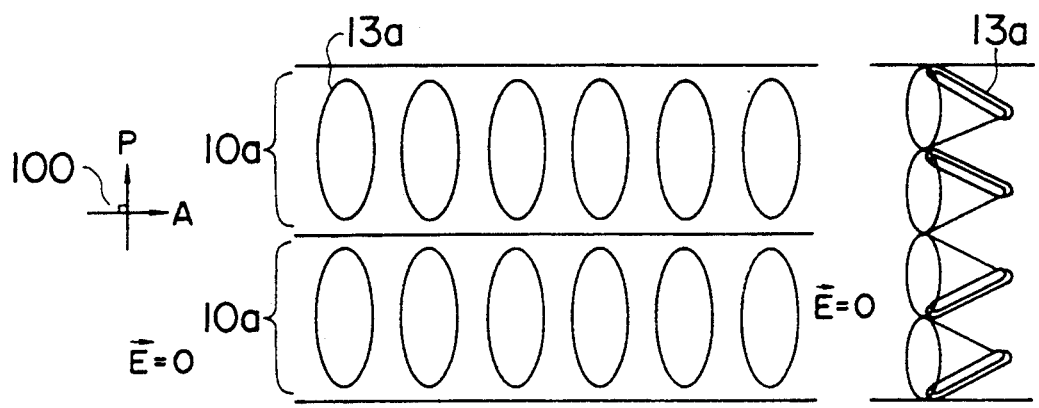
FIGS. 8A-8C show the orientation of the optically tristable liquid crystal molecules.
Figure 8B:
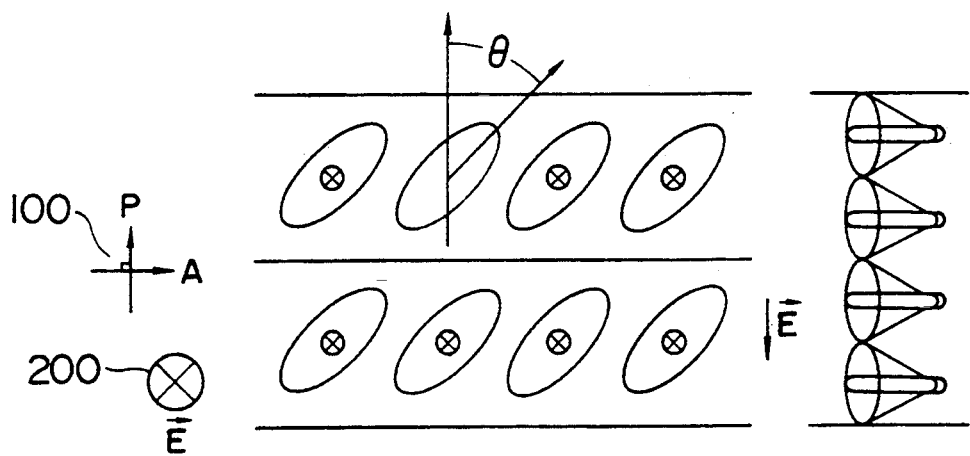
Figure 8C:
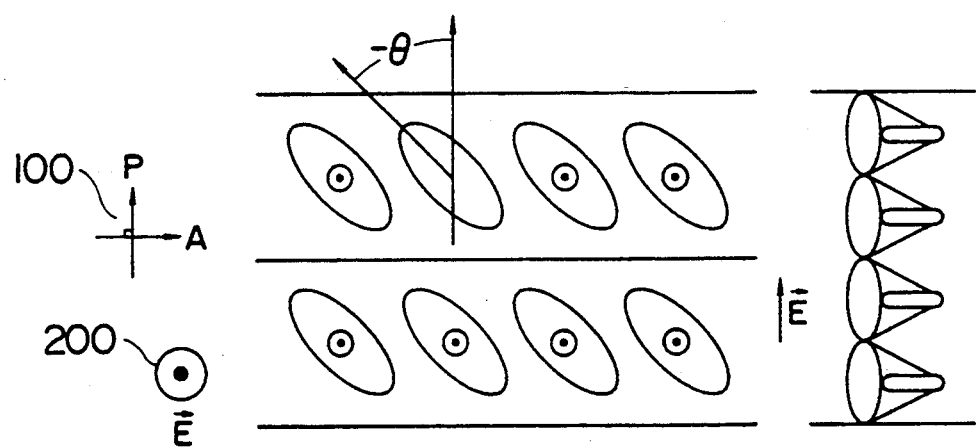
Figure 9A:
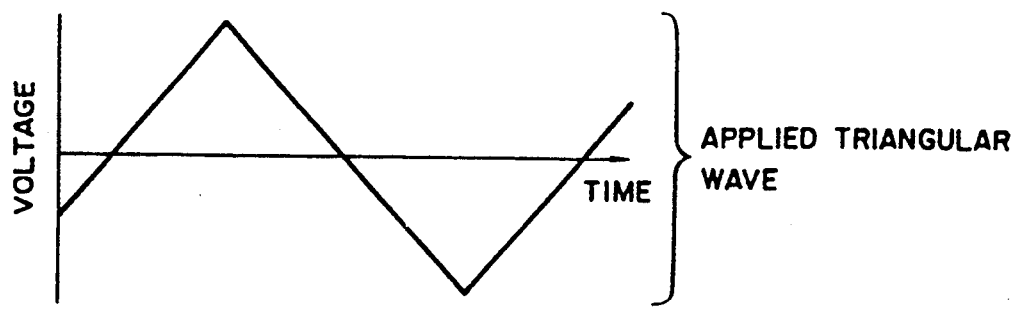
FIGS. 9A-9D show applied triangular wave voltage, optical response of nematic liquid crystal, optically bistable liquid crystal and optically tristable liquid crystal, respectively.
Figure 9B:
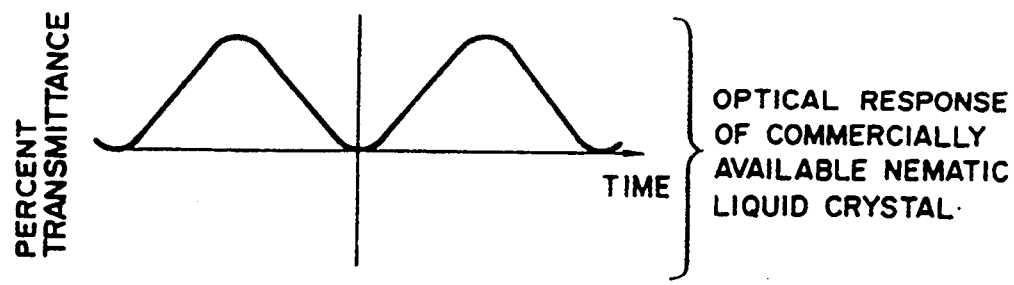
Figure 9C:
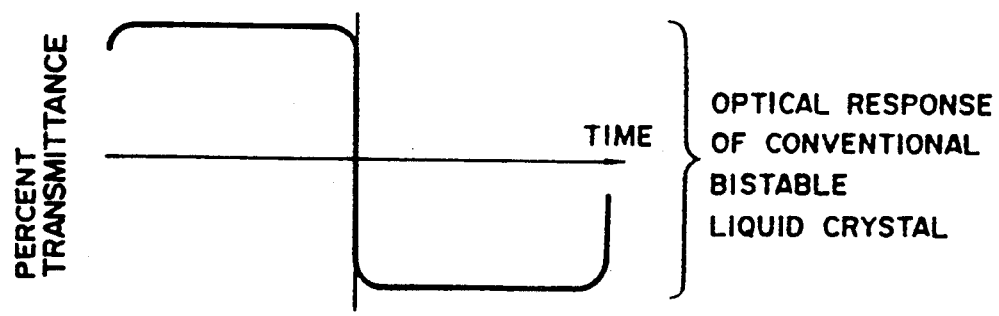
Figure 9D:
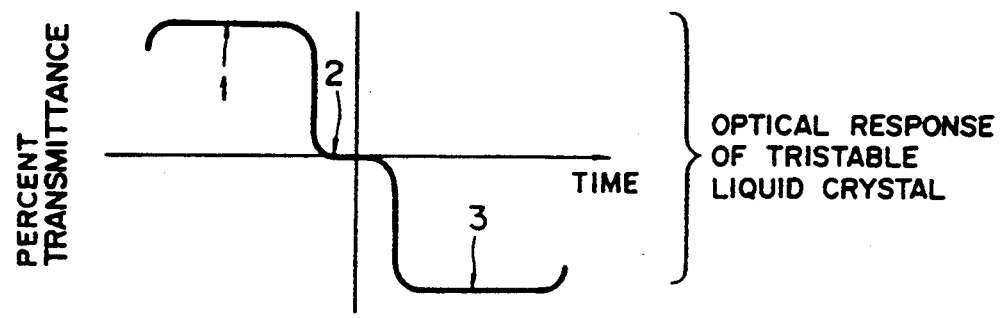

A feature of the present novel antiferroelectric liquid crystals lies in novel optically tristable states when the liquid crystal is in S*(3) phase which are greatly far from bistable states in chiral smectic C phase or S*c phase. The optically tristable states herein referred to mean that, when voltage in the form of a triangular wave as in FIG. 9A is applied to liquid crystal electrooptical devices where antiferroelectric liquid crystals are laid between the first electrode substrate plate and the second electrode substrate plate which is apart at a given space from the first one, the antiferroelectric liquid crystal shows the first stable molecular orientation and resultingly the first optically stable state shown in FIG. 8A and FIG. 9D 2, respectively, when electric voltage is zero. The antiferroelectric liquid crystal shows the second stable molecular orientation to result the second optically stable state as shown in FIG. 8B, and FIG. 9D 1, respectively, in one of the direction of electric field and shows the third stable molecular orientation to result the third optically stable state as shown in FIG. 8C, and FIG. 9D 3, respectively, in the other direction of electric field.

Figure 4:
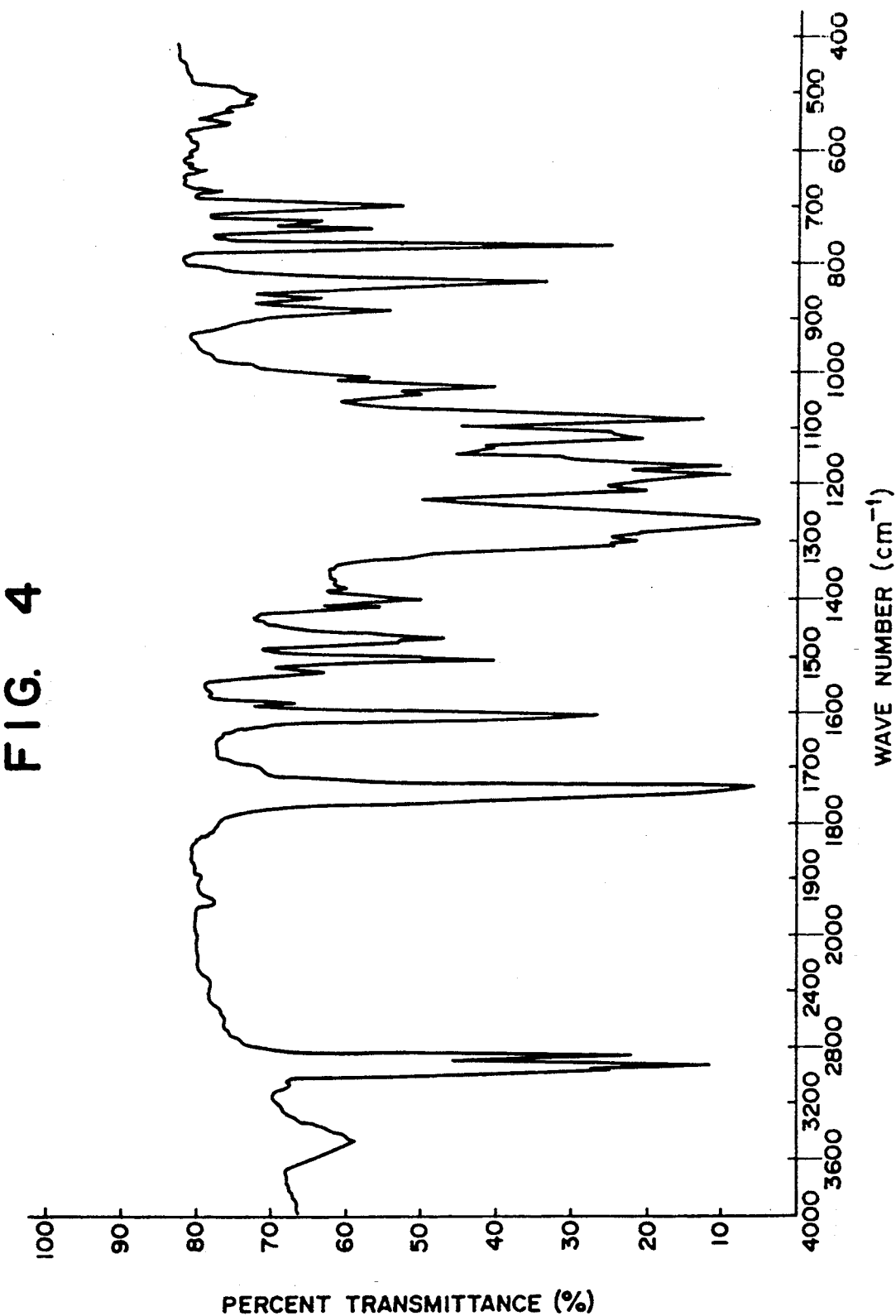

On the other hand, as in FIG. 4 (B) and (C), commercially available conventional nematic liquid crystals and bistable state liquid crystals do not have such optically tristable states.

Spontaneous polarizations of molecules of liquid crystal compounds have to be uniform in order to arrange the molecules of the liquid crystal compound in the same direction in response to electric field applied until tristable orientations are exhibited. In other words, according as optical purity of the liquid crystal compounds is higher, i.e. percentage of (R)-isomer or (S)-isomer is higher, tristable orientations and optically tristable states are easily exhibited. On the other hand, liquid crystal compounds having low optical purity, even if the compounds have the same chemical formula, do not exhibit the tristable orientations and optically tristable states, because spontaneous polarizations of the molecules are not uniform. Although Nakamura (U.S. Pat. No. 4,921,632) mentioned in Table 1 such several compounds as Compound Nos. 3 and 5 which are close to the present composition, he does not refer to optical purities or optically tristable states in S*(3) phase, since the compound Nos. 3 and 5 would not have had enough optical purities to exhibit optically tristable states.

The inventors have tried to make an improvement in liquid crystal compounds of the type referred to above on the basis of the above findings to succeed in manufacturing a series of liquid crystal compounds having not only a larger and physicochemically stable spontaneous polarization but also a higher speed of response. According to the present invention, an atomic or molecular group comprising fluorine of high electronegativity is directly introduced to the asymmetric carbon atom so as to enlarge dipole moment of the liquid crystal molecules and simultaneously raise three-dimensional interaction between the asymmetric carbon atom and a polar group of a carbonyl bond adjacent to the asymmetric carbon atom.

It has been found that liquid crystal compounds show tristability in molecular orientation fundamentally different from bistability in the conventional liquid crystal compounds and optical tristable states in response to the applied electric field.

Liquid crystal compounds according to the invention are represented by a formula;

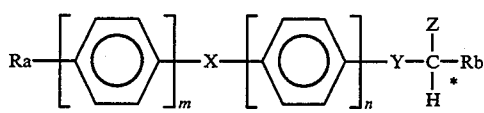

in which Ra means an alkyl group of 1–20 carbon atoms, preferably of 4–15 carbon atoms, or an alkoxy group of 1–20 carbon atoms, preferably of 4–15 carbon atoms; Rb means an aliphatic alkyl group, a branched alkyl group or an aralkyl group respectively of 1–20 carbon atoms, preferably of 4–15 carbon atoms, an alkoxy group of 1–20 carbon atoms or an alkanoyl methyl group of 1–20 carbon atoms; X means

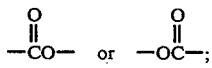

Y means or

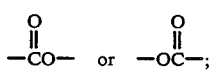

Z means a fluoroalkyl or a halogen-substituted fluoroalkyl; m is an integer of from 1 to 3; n is an integer of from 0 to 2 where when n is 0, Y is a single bond; and * shows an optically active center.

In the formula of the liquid crystal compounds of the invention, Ra means an alkyl group or an alkoxy group of 1–20 carbon atoms as referred to above, and preferably the alkyl group of 3–16 carbon atoms and the alkoxy group of 3–16 carbon atoms.

Rb therein means alkyl, branched alkyl, aralkyl, alkoxy or alkanoyl methyl group respectively of 1–20 carbon atoms as referred to above, and preferably normal alkyl group of 3–16 carbon atoms, which are in the alkyl position in case of the alkanoyl methyl group, hexyl, isobutyl, benzyl, substituted benzyl and phenethyl residue.

Z in the formula means a fluoroalkyl or a halogenated fluoroalkyl group as referred to above, and preferably $CH_3$, $CHF_2$, $CH_2F$, $C_2F_5$, $CClF_2$, $CCl_2F$, $CCl_3$, $CF_3CCl_2$, $C_3F_7$ or the like.

Typical groups represented by

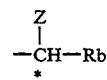

in the above formula of the objective compounds of the invention mean residues obtained by removing OH groups from the following respective compounds:
1,1,1-trifluoro-2-$C_3$–$C_{16}$ alkanol,
1,1-difluoro-2-$C_3$–$C_{16}$ alkanol,
1-monofluoro-2-$C_3$–$C_{16}$ alkanol,
1,1,1,2,2-pentafluoro-3-$C_3$–$C_{16}$ alkanol,
1-monofluoro-1,1-dichloro-2-$C_3$–$C_{16}$ alkanol,
1,1,1-trichloro-2-$C_3$–$C_{16}$ alkanol,
1,1-difluoro-1-monochloro-2-$C_3$–$C_{16}$ alkanol,
1,1,1-trifluoro-2-phenyl-2-ethanol,
1,1,1-trifluoro-3-phenyl-2-propanol or
1,1,1-trifluoro-4-phenyl-2-butanol.

Typical groups represented by a formula;

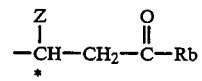

means residues obtained by removing OH groups from the following respective compounds:
1,1,1-trifluoro-3-pentanoyl-2-propanol,
1,1,1-trifluoro-3-hexanoyl-2-propanol,
1,1,1-trifluoro-3-heptanoyl-2-propanol,
1,1,1-trifluoro-3-octanoyl-2-propanol,
1,1,1-trifluoro-3-nonanoyl-2-propanol,
1,1,1-trifluoro-3-decanoyl-2-propanol,
1,1,1-trifluoro-3-undecanoyl-2-propanol,
1,1,1-trifluoro-3-dodecanoyl-2-propanol,
1,1,1-trifluoro-3-(3-methylbutanoyl)-2-propanol,
1,1,1-trifluoro-3-(3-phenylpropanoyl)-2-propanol,
1,1,1-trifluoro-3-(2-phenylethanoyl)-2-propanol or
1,1,1-trifluoro-3-benzoyl-2-propanol.

Preferable liquid crystal compounds of the invention are:

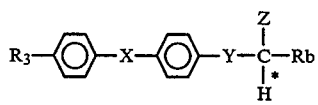

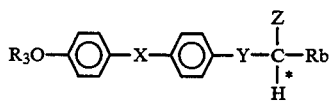

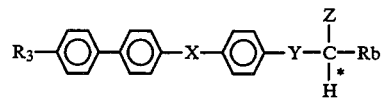

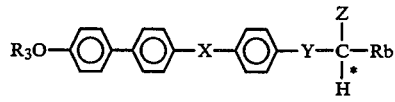

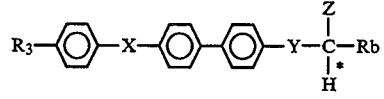

-continued

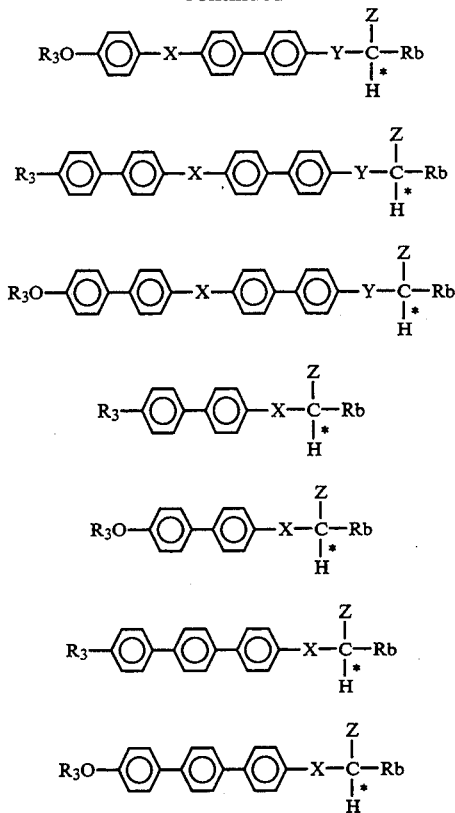

In said formulae, Rs means, for example, an alkyl group of 3-16 carbon atoms, and X, Y, Z and Rb are the same as those mentioned above.

More preferable compounds are;

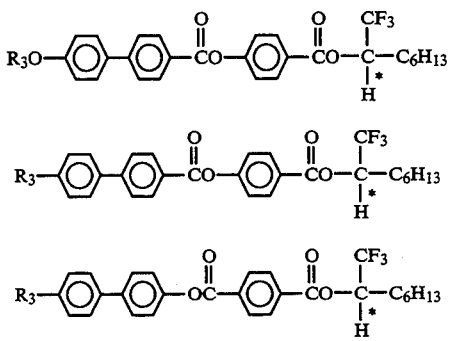

The liquid crystal compounds of the invention can be produced as follows.

4-Benzyloxybenzoic acid chloride is allowed to react with 1,1,1-trifluoro-2-alkanol to obtain 1,1,1-tri-fluoro-2-alkyl-4-benzyloxybenzoate, which is then hydrogenated to obtain 1,1,1-trifluoro-2-alkyl-4-hydroxy benzoate. The hydroxy alkyl ester obtained is allowed to react with 4-n-alkyloxyphenyl or biphenyl carboxylic acid chloride to obtain an objective compound, 4-(1,1,1-trifluoro-2-alkoxycarbonyl)-phenyl-4'-n-alkoxybiphenyl-4-carboxylate. Alternatively, 1,1,1-trifluoro-2-alkyl-4-hydroxybenzoate is allowed to react with 4-n-alkyloxyphenyl or biphenyl carboxylic acid in a solvent such as diethyl ether and tetrahydrofuran, in the presence of a catalyst such as N,N-dimethylaniline, 4-pyrrolidinopyridine etc. and a condensing agent such as dicyclohexylcarbodiimide, N,N-carbonyl diimidazole etc.

Another process is as follows.

4-Benzyloxybenzoic acid chloride is allowed to react with (3,3,3-trifluoro-2-hydroxy)propyl-n-alkylketone to obtain 1,1,1-trifluoro-3-alkanoyl-2-propyl 4-benzyloxybenzoate, which is then hydrogenated to obtain 1,1,1-trifluoro-3-alkanoyl-2-propyl 4-hydroxybenzoate. The hydroxy propyl ester obtained is allowed to react with 4-n-alkyloxyphenyl or biphenyl carboxylic acid chloride to obtain an objective compound, 4-(1,1,1-trifluoro-3-alkanoyl-2-propyloxycarbonyl)-phenyl 4'-n-alkanoylbenzoate.

The other process is that terephthalic acid chloride is allowed to react with 1,1,1-trifluoro-2-alkanol to obtain an 4-(1,1,1-trifluoro-2-alkyloxycarbonyl)benzoic acid chloride, which is allowed to react with a 4-alkyloxy-4'-hydroxybiphenyl to obtain an objective compound, 4-n-alkoxy-4'-biphenyl 4-(1,1,1-trifluoro-2-alkoxycarbonyl)-4-benzoate.

The present invention are explained in more detail with reference to the following Examples.

EXAMPLE 1

1) Synthesis of 1,1,1-trifluoro-2-octyl 4-benzyloxybenzoate

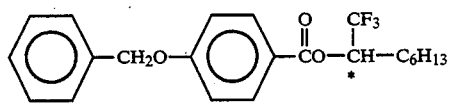

To a solution of 4-benzyloxybenzoic acid chloride (4.3 g) in methylene chloride (50 ml) was added drop by drop a solution of (R)-(+)-1,1,1-trifluoro-2-octanol (2.9 g), dimethylaminopyridine (0.6 g) and triethylamine (1.7 g) in methylene chloride (50 ml), under ice cooling. The mixture was left to stand at the room temperature for 24 hours before being poured in ice water. The methylene chloride layer separated was washed with diluted hydrochloric acid, water 1N aqueous sodium carbonate solution and water in this order, dried over magnesium sulfate and distilled to obtain a crude objective compound. The compound was purified by toluene/silica gel chromatography and recrystallization from ethanol to obtain the titled compound (3.8 g).

2) Synthesis of 1,1,1-trifluoro-2-octyl 4-hydroxybenzoate

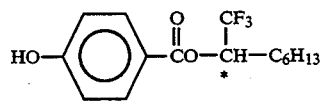

To a solution of the compound obtained in 1) above (3.8 g) in methanol (100 ml) was added carbon (0.4 g) on which 10% Pd was carried. The mixture was subjected to hydrogenation in an atmosphere of hydrogen to obtain the titled compound (2.8 g).

3) Synthesis of
4-(1,1,1-trifluoro-2-octyloxycarbonyl)phenyl
4'-n-hexyloxybiphenyl-4-carboxylate

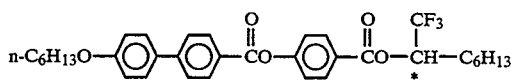

4-n-Hexyloxybiphenyl carboxylic acid (3.0 g) and an excessive amount of thionyl chloride were heated under refluxing for 6 hours. Unaltered thionyl chloride was distilled off to obtain 4-n-hexyloxybiphenyl carboxylic acid chloride.

To a solution of the acid chloride in methylene chloride (50 ml) was added a solution of 1,1,1-trifluoro-2-octyl 4-hydroxybenzoate obtained in the above (2.8 g), triethylamine (1.0 g) and dimethylaminopyridine (0.3 g) in methylene chloride (50 ml), under ice cooling. The mixture was left to stand at the room temperature for 24 hours. The reaction product was poured in ice water. The methylene chloride layer separated was washed with diluted hydrochloric acid, water, 1N aqueous solution of sodium carbonate and water in this order, dried over sodium sulfate and subjected to distillation. The product was purified by toluene/silica gel chromatography to obtain a product (2.1 g) which was further purified by recrystallization from absolute ethanol to obtain the titled compound.

Phase transition points are shown later.

EXAMPLE 2-6

Examples were repeated except that in place of the 4-n-hexyloxybiphenyl carboxylic acid used in Example 1-(3),
2. 4-n-octyloxybiphenyl carboxylic acid (3.0 g),
3. 4-n-nonyloxybiphenyl carboxylic acid (3.1 g),
4. 4-n-decyloxybiphenyl carboxylic acid (3.1 g),
5. 4-n-undecyloxybiphenyl carboxylic acid (3.2 g),
6. 4-n-dodecyloxybiphenyl carboxylic acid (3.2 g) were respectively used. The products are 2. 4-(1,1,1-trifluoro-2-octyloxycarbonyl)-phenyl 4'-n-octyloxybiphenyl-4-carboxylate

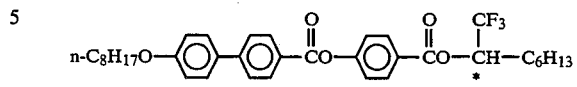

3. 4-(1,1,1-trifluoro-2-octyloxycarbonyl)-phenyl 4'-n-nonyloxybiphenyl-4-carboxylate

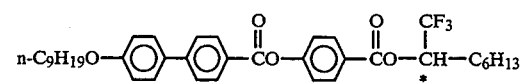

4. 4-(1,1,1-trifluoro-2-octyloxycarbonyl)-phenyl-4'-n-decyloxybiphenyl-4-carboxylate

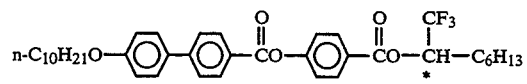

5. 4-(1,1,1-trifluoro-2-octyloxycarbonyl)-phenyl 4'-n-undecyloxybiphenyl-4-carboxylate

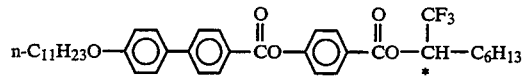

6. 4-(1,1,1-trifluoro-2-octyloxycarbonyl)-phenyl 4'-n-dodecyloxybiphenyl-4-carboxylate

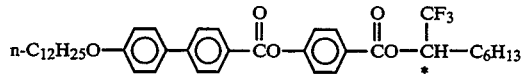

The liquid crystal cmpounds referred to above, have phase transition points (°C.) as follows. S*(3) represents chiral smetic phase showing the tristable state.

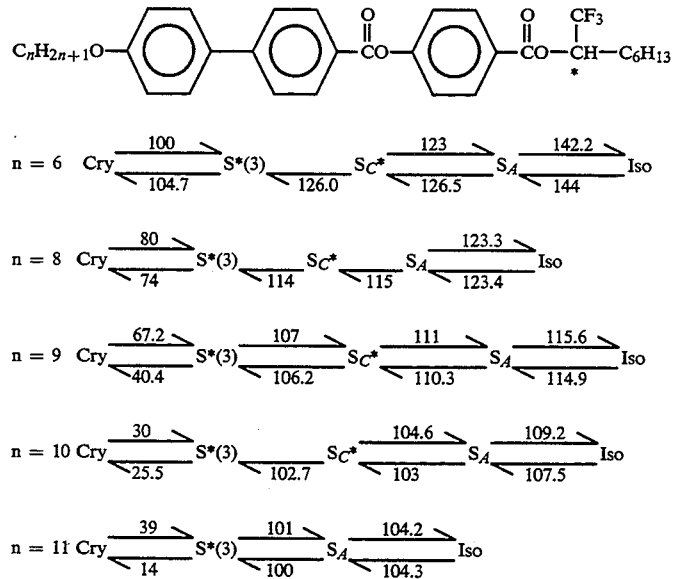

n = 12 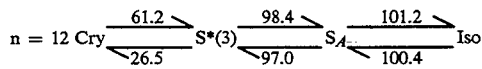

The nuclear magnetic resonance spectra of the above liquid crystal compounds according to the invention are as shown in Tables 1–5.

Figure 2:
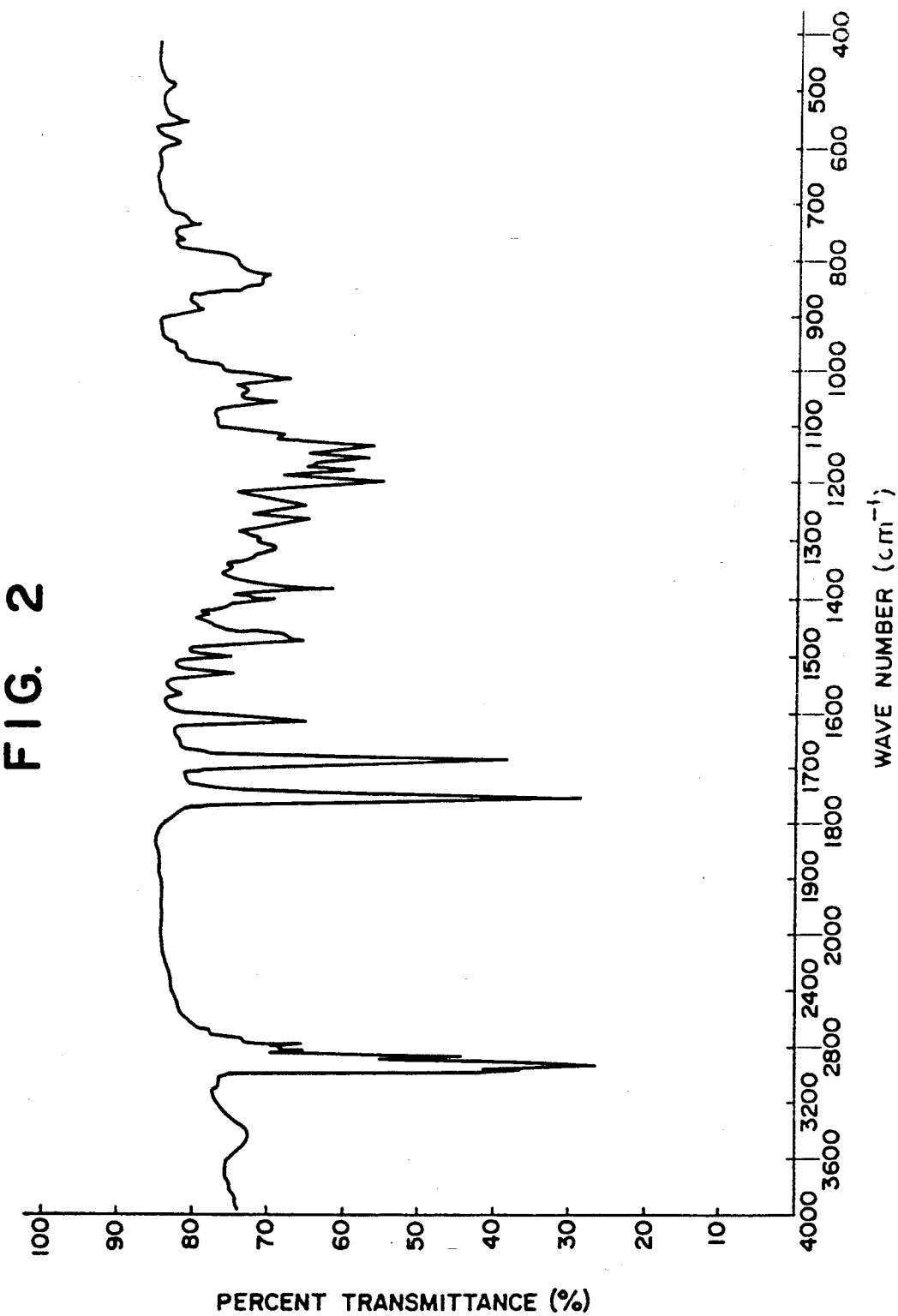
Figure 3:
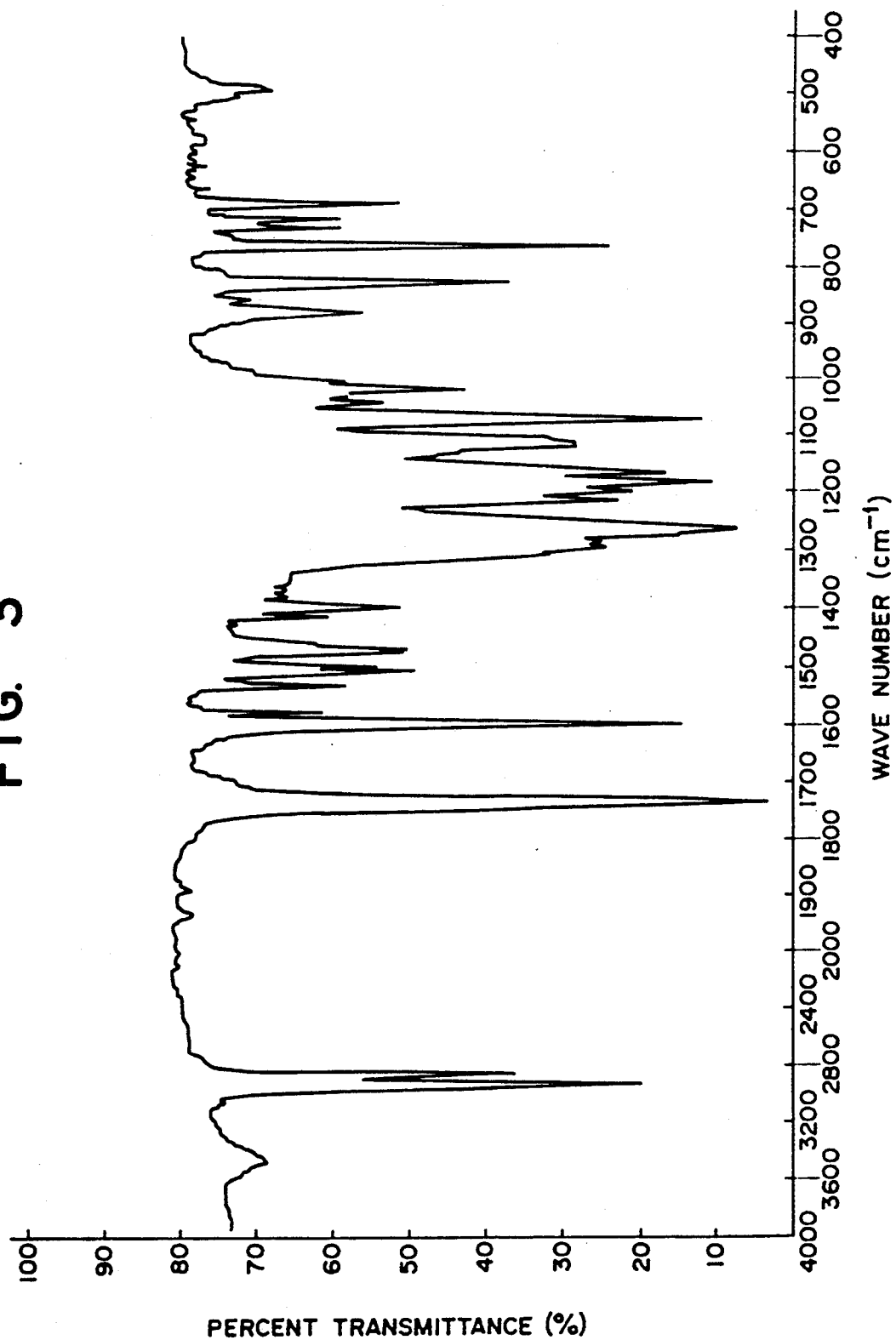
Figure 5:
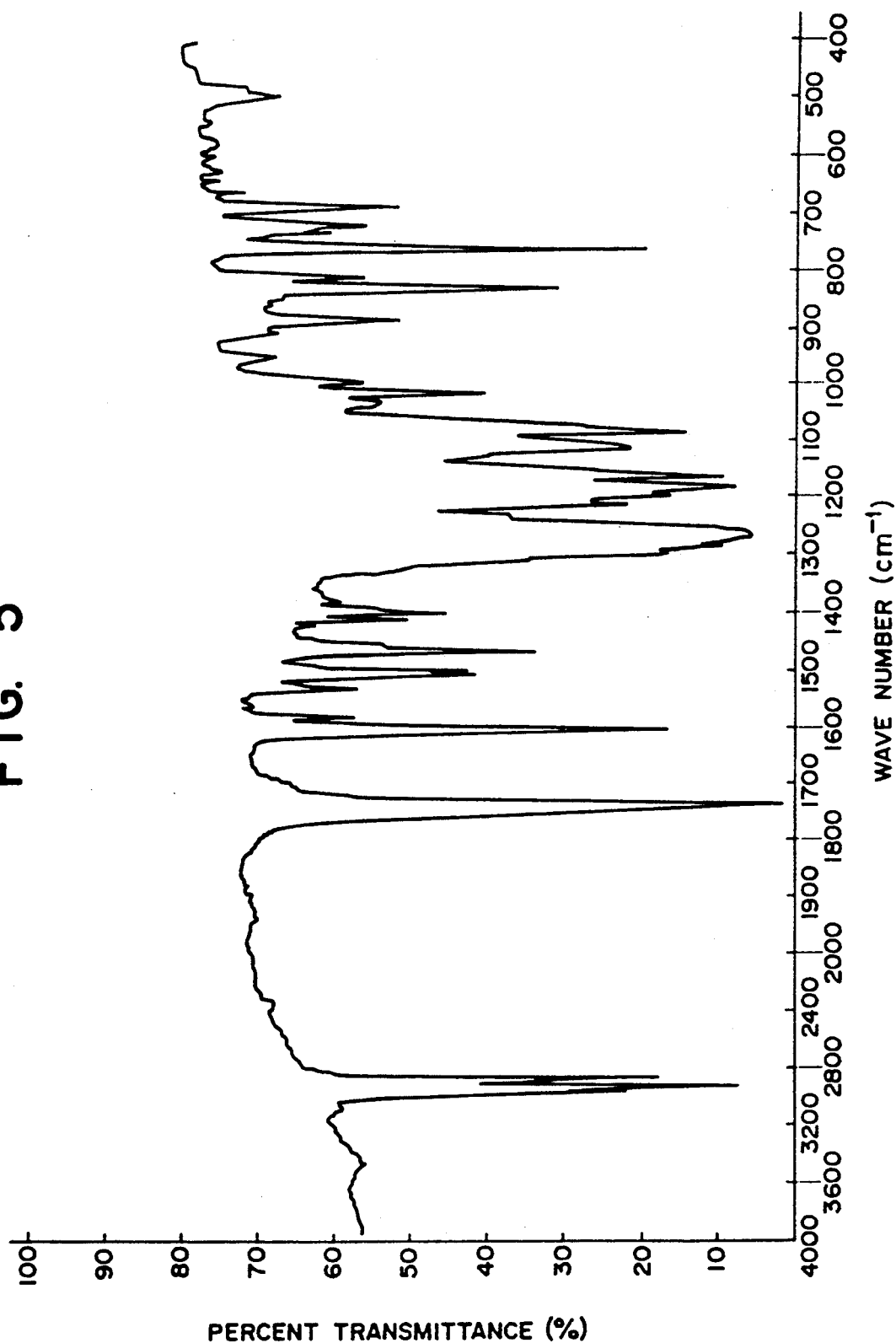

The infrared absorption spectra (KBr) of the above liquid crystal compounds of the invention are shown in FIG. 1 (n=6), FIG. 2 (n=8), FIG. 3 (n=9), FIG. 4 (n=10) and FIG. 5 (n=11).

EXAMPLE 7

1) Synthesis of 1,1,1-trifluoro-3-heptanoyl-2-propyl-4-benzyloxybenzoate

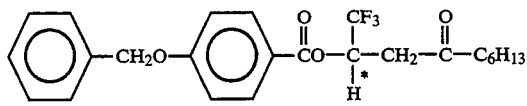

To a solution of 4-benzyloxybenzoic acid chloride (16 g) in methylene chloride (100 ml) were added under ice cooling. (+)-(3,3,3-trifluoro-2-hydroxy) propyl-n-hexyl ketone (10 g), pyridine (5.2 g) and dimethylaminopyridine (8 g). The mixture was left to stand at the room temperature for 24 hours, before being poured in ice water. The methylene chloride phase separated was washed with diluted hydrochloric acid, water, 1N aqueous solution of sodium carbonate and water in this order and dried over magnesium sulfate. After distillation was over, purification with toluene/silica gel chromatography gave the titled compound (12 g).

2) Synthesis of 1,1,1-trifluoro-3-heptanoyl-2-propyl-4-hydroxybenzoate

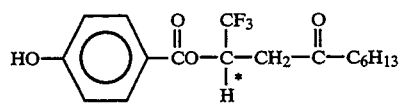

To a solution of the compound obtained in the above (12 g) in ethanol (100 ml) was added 10% palladium on carbon (1.3 g). The mixture was hydrogenated at the room temperature in hydrogen gas under pressure for 5 hours to obtain the titled compound (10 g).

3) Synthesis of 4-(1,1,1-trifluoro-3-heptanoyl-2-propyloxycarbonyl)-phenyl 4-n-octyloxybenzoate

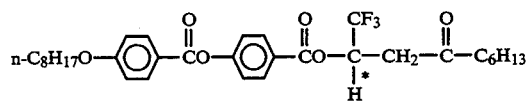

After 4-n-octyloxybenzoic acid (11 g) and an excessive amount of thionyl chloride were heated under refluxing for 6 hours, unaltered thionyl chloride was distilled off to obtain 4-n-octyloxybenzoic acid chloride.

To a solution of 1,1,1-trifluoro-3-heptanoyl-2-propyl-4-hydroxybenzoate obtained in the above (10 g), pyridine (3.4 g) and dimethylaminopyridine (5.4 g) in methylene chloride (50 ml) was added under stirring and ice cooling a solution of the above 4-n-octyloxybenzoic acid chloride (11 g) in methylene chloride. The mixture was left to stand at the room temperature for 24 hours, and poured in ice water. The methylene chloride phase separated was washed with diluted hydrochloric acid, water, 1N aqueous solution of sodium carbonate and water in this order, dried over magnesium sulfate and subjected to distillation to obtain the crude titled compound, which was then purified according to toluene/silica gel chromatography and recrystallization from ethanol. Yield 6 g. The compound was further purified by recrystallization from pure ethanol.

This compound has phase transition points (°C.) as follows.

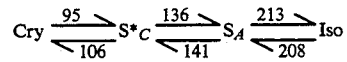

The above procedure was repeated except that, in place of 4-benzyloxybenzoic acid chloride in 1), 4-benzyloxy-phenylbenzoic acid chloride (22 g) was used to obtain 4-(1,1,1-trifluoro-3-heptanoyl-2-propyloxy-carbonyl)-phenyl-4-n-octyloxybiphenyl-4-carboxylate.

EXAMPLE 8

1) Synthesis of 4-(1,1,1-trifluoro-2-octyloxycarbonyl)benzoate

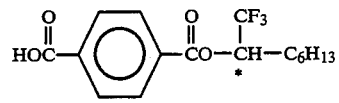

To a solution of terephthalic acid chloride (11.2 g) in methylene chloride (50 ml) were added drop by drop (+)-1,1,1-trifluoro-2-octanol (9.2 g), pyridine (13 g) and dimethylaminopyridine (6.1 g), under ice cooling. The mixture was left to stand at the room temperature for 24 hours and poured in ice water. The methylene chloride layer separated was washed with diluted hydrochloric acid, water, 1N aqueous solution of sodium carbonate and water in this order, before being dried over magnesium sulfate and subjected to distillation. The product was purified according to toluene/silica gel chromatography to obtain the titled compound (3.3 g).

2) Synthesis of 4-n-dodecyloxy-4'-biphenyl-4-(1,1,1-trifluoro-2-octyloxycarbonyl)benzoate

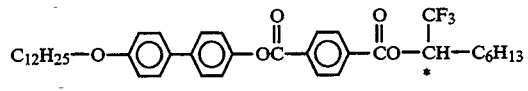

A mixture of 4-(1,1,1-trifluoro-2-octyloxycarbonyl)-benzoate obtained in the above (3.3 g), 4-dodecyloxy-4'-hydroxybiphenyl (3.9 g), dicyclohexylcarbodiimide (3.1 g) and dimethylaminopyridine (0.3 g) was added tetrahydrofuran (100 ml) and the mixture was kept to stand at the room temperature for 24 hours.

After the reaction product was subjected to vacuum distillation for removing some amount of the solvent, it was poured in ice water. The methylene chloride phase separated was washed with diluted hydrochloric acid, water, 1N aqueous solution of sodium carbonate, and water in this order, before being dried over sodium sulfate and distilled. The crude titled compound was then treated according to toluene/silica gel chromatography and recrystallizations from ethanol. Yield: 1.4 g.

The compound has following phase transition points.

$$Cry \xrightarrow{42.0} S^*_C \xrightarrow{76.1} S_A \xrightarrow{112.0} Iso$$

EXAMPLE 9

Synthesis of
4-(1,1,1-trifluoro-2-octyloxycarbonyl)-phenyl
4'-n-octylbiphenyl-4-carboxylate

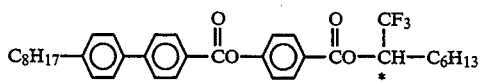

Example 1-(3) was repeated except that 4-n-octylbiphenyl-4'-carboxylic acid (3.2 g) was used in place of the 4-n-hexyloxybiphenyl-4'-carboxylic acid obtain the titled compound.

The above compound shows phase transition points as follows.

$$Cry \xrightarrow[24.5]{46.0} S^*(3) \xrightarrow[74.0]{74.0} S^*_C \xrightarrow[75.4]{46.8} S_A \xrightarrow[79.2]{79.1} Iso$$

A nuclear magnetic resonance spectrum thereof is shown in Table 6.

EXAMPLE 10

Synthesis of
4-(1,1,1-trifluoro-2-decyloxycarbonyl)-phenyl
4'-n-octyloxybiphenyl-4-carboxylate

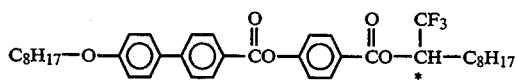

Example 1-(1) was repeated except that (+)-1,1,1-trifluoro-2-decanol (3.2 g) was used in place of the (+)-1,1,1-trifluoro-2-octanol to obtain the titled compound.

This compound shows phase transition points as follows.

$$Cry \xrightarrow{57.0} S^*(3) \xrightarrow{103.0} S^*_C \xrightarrow{103.5} S_A \xrightarrow{114.0} Iso$$

EXAMPLE 11

Synthesis of
4-(1,1,1,2,2-pentafluoro-3-undecyloxycarbonyl)-phenyl
4'-n-octyloxybiphenyl-4-carboxylate

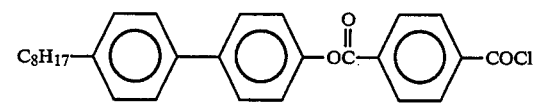

Example 1-(1) was repeated except that (−)-1,1,1,2,2-pentafluoro-3-undecanol was used in place of the 1,1,1-trifluoro-2-octanol to obtain the titled compound.

$$Cry \xrightarrow{38.8} S^*(3) \xrightarrow{70.0} S^*_C \xrightarrow{76.8} S_A \xrightarrow{85.5} Iso$$

EXAMPLE 12

1) Synthesis of 4-octyl-biphenyl-4'-terephthalic acid chloride

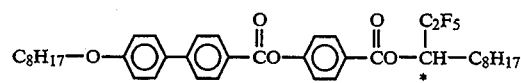

To a solution of 4-hydroxy-4'-octylbiphenyl (0.5 g) and terephthaloyl chloride (0.36 g) in about dichloromethane (30 ml) was added drop by drop triethylamine (0.2 g). To the solution was added dimethylaminopyridine (0.013 g) and the mixture was stirred at the room temperature for 10 hours to obtain the titled compound.

2) Synthesis of 4-n-octylbiphenyl
4-(1,1,1-trifluoro-2-octyloxycarbonyl)benzoate

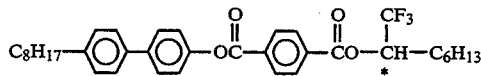

To the product of 1) were added (+)-1,1,1-trifluorooctanol, and then triethylamine, (0.2 g), drop by drop and then dimethylaminopyridine (0,013 g). The mixture was stirred at the room temperature for about 10 hours. After insoluble matters were filtered, the filtrate was neutralized and extracted with water/dichloromethane. After distillation of water and the solvent was over, the crude titled compound was obtained (0.8 g). The compound was purified by silica gel chromatography with ethanol to obtain the titled compound (0.2 g).

The above compound showed phase transition points as follows.

-continued

Cry $\underset{\underset{25}{\longleftarrow}}{\overset{69}{\longrightarrow}}$ S$_A$ $\underset{\underset{114}{\longleftarrow}}{\overset{113}{\longrightarrow}}$ Iso A nuclear magnetic resonance spectrum is shown in Table 7.

EXAMPLE 13

Synthesis of 4-(1,1,1-trifluoro-2-octyloxycarbonyl)biphenyl 4-n-octylbenzoate

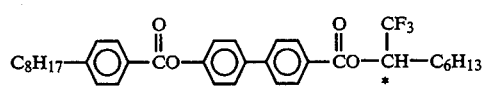

4-(1,1,1-Trifluoro-2-octyloxycarbonyl)phenylphenol (0.5 g) was allowed to react with octylbenzoate (0.31 g) in the presence of dicyclocarbodiimide (0.3 g), a few pieces of dimethylaminopyridine and tetrahydrofuran (30 ml) to obtain the crude titled compound. The compound was purified by toluene/silica gel chromatography with hexane/ethyl acetate (10/0.5) and recrystallization from ethanol to obtain the titled compound (0.1 g).

The liquid crystal has following phase transition points.

Cry $\underset{-20}{\longleftarrow}$ S* (3) $\underset{38}{\longleftarrow}$ S*$_C$ $\underset{40}{\longleftarrow}$ S$_A$ $\underset{61.9}{\longleftarrow}$ Iso A nuclear magnetic resonance spectrum is shown in Table 8.

TABLE 1

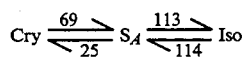

| Carbon | ppm | Remarks | Carbon | ppm | Remarks |
|---|---|---|---|---|---|
| A | 14.0 | Methyl Carbon | O | 164.3 | Carbonyl Carbon |
| B | 22.5 | Methylene Carbon | P | 155.4 | Aromatic Ring Carbon Adjacent to 0 |
| C | 31.6 | " | Q | 122.0 | Aromatic Ring |
| D | 25.8 | " | R | 131.6 | " |
| E | 29.3 | " | S | 126.4 | Aromatic Ring Carbon Adjacent to Carbonyl |
| F | 68.2 | Methylene Carbon Adjacent to 0 | T | 124.1 | F3 Substituted Methyl Carbon |
| G | 159.3 | Aromatic Ring Carbon Adjacent to 0 | U | 70.3 | Methine Carbon Adjacent to F3 Substituted Methyl |
| H | 115.0 | Aromatic Ring Carbon | C | 28.2 | Methylene Carbon |
| I | 128.4 | " | W | 24.6 | " |
| J | 131.8 | " | X | 28.8 | " |
| K | 146.4 | " | Y | 31.4 | " |
| L | 126.6 | " | | | |
| M | 130.7 | " | | | |
| N | 126.9 | Aromatic Ring Carbon Adjacent to Carbonyl | | | |

TABLE 2

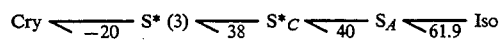

| Carbon | ppm | Remarks | Carbon | ppm | Remarks |
|---|---|---|---|---|---|
| A | 14.0 | Methyl Carbon | O | 164.3 | Carbonyl Carbon |
| B | 22.6 | Methylene Carbon | P | 155.4 | Aromatic Ring Carbon Adjacent to 0 |
| C | 31.9 | " | Q | 122.0 | Aromatic Ring |
| D | 29.5 | " | R | 131.6 | " |
| E | 26.1 | " | S | 126.4 | Aromatic Ring Carbon Adjacent to Carbonyl |
| F | 68.2 | Methylene Carbon Adjacent to 0 | T | 124.1 | F3 Substituted Methyl Carbon |
| G | 159.7 | Aromatic Ring Carbon Adjacent to 0 | U | 70.3 | Methine Carbon Adjacent to F3 Substituted Methyl |
| H | 115.1 | Aromatic Ring Carbon | C | 28.1 | Methylene Carbon |
| I | 128.4 | " | W | 24.6 | " |
| J | 131.8 | " | X | 28.8 | " |
| K | 146.4 | " | Y | 31.5 | " |
| L | 126.6 | " | | | |
| M | 130.7 | " | | | |
| N | 126.9 | Aromatic Ring Carbon Adjacent to Carbonyl | | | |

TABLE 3

(A) (B) (C) (D) (E) (D) (F) (G) (H) (I) (J) (K) (L) (M) (N) (O) (P) (Q) (R) (S) (O) (T) (U) (V) (W) (X) (Y) (B) (A)
CH₃CH₂CH₂(CH₂)₄CH₂CH₂CH₂O—⟨ ⟩—⟨ ⟩—CO—O—⟨ ⟩—CO—O—CHCH₂CH₂CH₂CH₂CH₂CH₃
with CF₃ at (T)

| Carbon | ppm | Remarks | Carbon | ppm | Remarks |
|---|---|---|---|---|---|
| A | 14.0 | Methyl Carbon | O | 164.2 | Carbonyl Carbon |
| B | 22.6 | Methylene Carbon | P | 155.4 | Aromatic Ring Carbon Adjacent to 0 |
| C | 32.0 | " | Q | 122.0 | Aromatic Ring |
| D | 29.5 | " | R | 131.6 | " |
| E | 26.2 | " | S | 126.4 | Aromatic Ring Carbon Adjacent to Carbonyl |
| F | 68.2 | Methylene Carbon Adjacent to 0 | T | 124.1 | F3 Substituted Methyl Carbon |
| G | 159.7 | Aromatic Ring Carbon Adjacent to 0 | U | 70.4 | Methine Carbon Adjacent to F3 Substituted Methyl |
| H | 115.1 | Aromatic Ring Carbon | C | 28.1 | Methylene Carbon |
| I | 128.3 | " | W | 24.6 | " |
| J | 131.8 | " | X | 28.8 | " |
| K | 146.4 | " | Y | 31.5 | " |
| L | 126.6 | " | | | |
| M | 130.7 | " | | | |
| N | 126.9 | Aromatic Ring Carbon Adjacent to Carbonyl | | | |

TABLE 4

(A) (B) (C) (D) (E) (D) (F) (G) (H) (I) (J) (K) (L) (M) (N) (O) (P) (Q) (R) (S) (O) (T) (U) (V) (W) (X) (Y) (B) (A)
CH₃CH₂CH₂(CH₂)₅CH₂CH₂CH₂O—⟨ ⟩—⟨ ⟩—CO—O—⟨ ⟩—CO—O—CHCH₂CH₂CH₂CH₂CH₂CH₃
with CF₃ at (T)

| Carbon | ppm | Remarks | Carbon | ppm | Remarks |
|---|---|---|---|---|---|
| A | 14.0 | Methyl Carbon | O | 164.3 | Carbonyl Carbon |
| B | 22.6 | Methylene Carbon | P | 155.4 | Aromatic Ring Carbon Adjacent to 0 |
| C | 32.0 | " | Q | 122.0 | Aromatic Ring |
| D | 29.5 | " | R | 131.6 | " |
| E | 26.1 | " | S | 126.4 | Aromatic Ring Carbon Adjacent to Carbonyl |
| F | 68.2 | Methylene Carbon Adjacent to 0 | T | 124.0 | F3 Substituted Methyl Carbon |
| G | 159.7 | Aromatic Ring Carbon Adjacent to 0 | U | 70.4 | Methine Carbon Adjacent to F3 Substituted Methyl |
| H | 115.1 | Aromatic Ring Carbon | C | 28.2 | Methylene Carbon |
| I | 128.3 | " | W | 24.6 | " |
| J | 131.7 | " | X | 28.8 | " |
| K | 146.3 | " | Y | 31.5 | " |
| L | 126.6 | " | | | |
| M | 130.8 | " | | | |
| N | 126.9 | Aromatic Ring Carbon Adjacent to Carbonyl | | | |

TABLE 5

(A) (B) (C) (D) (E) (D) (F) (G) (H) (I) (J) (K) (L) (M) (N) (O) (P) (Q) (R) (S) (O) (T) (U) (V) (W) (X) (Y) (B) (A)
CH₃CH₂CH₂(CH₂)₆CH₂CH₂CH₂O—⟨ ⟩—⟨ ⟩—CO—O—⟨ ⟩—CO—O—CHCH₂CH₂CH₂CH₂CH₂CH₃
with CF₃ at (T)

| Carbon | ppm | Remarks | Carbon | ppm | Remarks |
|---|---|---|---|---|---|
| A | 14.0 | Methyl Carbon | O | 164.3 | Carbonyl Carbon |
| B | 22.6 | Methylene Carbon | P | 155.3 | Aromatic Ring Carbon Adjacent to 0 |
| C | 31.9 | " | Q | 122.0 | Aromatic Ring Carbon |
| D | 29.5 | " | R | 131.6 | " |
| E | 26.1 | " | S | 126.3 | Aromatic Ring Carbon Adjacent to Carbonyl |
| F | 68.2 | Methylene Carbon Adjacent to 0 | T | 124.0 | F3 Substituted Methyl Carbon |
| G | 159.7 | Aromatic Ring Carbon Adjacent to 0 | U | 70.3 | Methine Carbon Adjacent to F3 Substituted Methyl |
| H | 115.0 | Aromatic Ring Carbon | V | 28.1 | Methylene Carbon |
| I | 128.3 | " | W | 24.5 | " |
| J | 131.8 | " | X | 28.8 | " |
| K | 146.3 | " | Y | 31.4 | " |
| L | 126.6 | " | | | |
| M | 130.7 | " | | | |
| N | 126.9 | Aromatic Ring Carbon Adjacent to Carbonyl | | | |

TABLE 6

(A) (B) (C) (D)  (E) (F) (G)  (H)(I)(J)(K)(L)  (M)CO(N)O(O)  (P)(Q)(R)  CO(N)O  (S)CF₃ | (U)(V)(W)(E)(B)(A)
CH₃CH₂CH₂(CH₂)₃CH₂CH₂—[ring]—[ring]—CO—O—[ring]—CO—CHCH₂CH₂CH₂CH₂CH₂CH₃ (T)

| Carbon | ppm | Remarks | Carbon | ppm | Remarks |
|---|---|---|---|---|---|
| A | 14.0 | Methyl Carbon | O | 155.4 | Aromatic Ring Carbon Adjacent to 0 |
| B | 22.6 | Methylene Carbon | P | 122.0 | Aromatic Ring Carbon |
| C | 31.9 | " | Q | 131.6 | " |
| D | 29.5 | " | R | 126.4 | Aromatic Ring Carbon Adjacent to Carbonyl |
| E | 31.5 | " | S | 124.0 | F3 Substituted Methyl Carbon |
| F | 35.7 | Methylene Carbon Adjacent to Aromatic Ring | T | 70.3 | Methine Carbon Adjacent to F3 Substituted Methyl Carbon |
| G | 143.5 | Aromatic Ring Carbon Adjacent to Methylene | | | |
| H | 129.0 | Aromatic Ring Carbon | U | 28.1 | Methylene Carbon |
| I | 127.1 | " | V | 24.6 | " |
| J | 137.0 | " | W | 28.8 | " |
| K | 146.7 | " | | | |
| L | 130.7 | " | | | |
| M | 127.4 | Aromatic Ring Carbon Adjacent to Carbonyl | | | |
| N | 164.3 | Carbonyl Carbon | | | |

TABLE 7

(A)(B)(C)(D)(D)(E)(F)(G) (H)(I)(J)(K)(L)(M)(N)OC(O)(P)(Q)(Q)(R)CO(O) (S)CF₃ | (U)(V)(W)(E)(B)(A)
CH₃CH₂CH₂(CH₂)₂CH₂CH₂CH₂—[ring]—[ring]—O—CO—[ring]—CO—CHCH₂CH₂CH₂CH₂CH₂CH₃ (T)

| Carbon | ppm | Remarks | Carbon | ppm | Remarks |
|---|---|---|---|---|---|
| A | 14.0 | Methyl Carbon | O | 164.1 | Ester Carbon |
| B | 22.6 | Methylene Carbon | P | 134.1 | Aromatic Ring Carbon Adjacent to Carbonyl |
| C | 31.9 | " | Q | 130.1 | Aromatic Ring Carbon |
| D | 29.4 | " | R | 133.1 | Aromatic Ring Carbon Adjacent to Carbonyl |
| E | 31.4 | " | S | 123.9 | F3 Substituted Methyl Carbon |
| F | 35.6 | " | T | 70.3 | Methine Carbon Adjacent to F3 Substituted Methyl Carbon |
| G | 142.2 | Aromatic Ring Carbon | | | |
| H | 128.8 | Aromatic Ring Carbon | u | 28.1 | Methylene Carbon |
| I | 126.9 | " | V | 24.5 | " |
| J | 137.5 | " | W | 28.9 | " |
| K | 139.3 | " | | | |
| L | 128.0 | " | | | |
| M | 121.6 | " | | | |
| N | 150.0 | Aromatic Ring Carbon Adjacent to 0 | | | |

TABLE 8

(A)(B)(C)(D)(E)(F)(G) (H)(I)(J) O(K) (L)(M)(N) (O)(P)(Q)(R) (S) O(K) (U)CF₃ | (V)(W)(X)(Y)(B)(A)
CH₃CH₂CH₂(CH₂)₃CH₂CH₂—[ring]—CO—O—[ring]—[ring]—CO—CH—CH₂CH₂CH₂CH₂CH₂CH₃ (T)

| Carbon | ppm | Remarks | Carbon | ppm | Remarks |
|---|---|---|---|---|---|
| A | 14.0 | Methyl Carbon | O | 137.4 | Aromatic Ring Carbon |
| B | 22.6 | Methylene Carbon | P | 145.6 | " |
| C | 31.9 | " | Q | 127.1 | " |
| D | 29.4 | " | R | 130.5 | " |
| E | 31.2 | " | S | 127.6 | " |
| F | 36.1 | Methylene Carbon Adjacent to Aromatic Ring | T | 70.3 | Methine Carbon Adjacent to F3 Substituted Methyl Carbon |
| G | 149.5 | Aromatic Ring Carbon Adjacent to Methylene | | | |
| H | 128.6 | Aromatic Ring Carbon | U | 124.0 | F3 Substituted Methyl Carbon |
| I | 130.2 | " | V | 28.1 | Methylene Carbon |
| J | 126.8 | " | W | 24.6 | " |
| K | 164.9 | " | X | 28.8 | " |
| L | 151.3 | Aromatic Ring Carbon Adjacent to 0 | Y | 31.4 | " |
| M | 122.3 | Aromatic Ring Carbon | | | |
| N | 128.3 | " | | | |

EXAMPLE 14

Synthesis of
(R)-(+)-4-(1,1,1-trifluoro-2-octyloxycarbonyl)phenyl 4'-n-octylbiphenyl-4-carboxylate

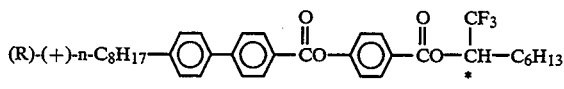

1) Synthesis of (R)-(+)-1,1,1-trifluoro-2-octyl 4-benzyloxybenzoate

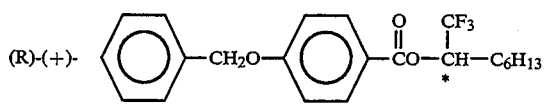

To a solution of 4-benzyloxybenzoic acid chloride (4.3 g) in methylene chloride (50 ml) was added a solution of (R)-(+)-1,1,1-trifluoro-2-octanol (2.9 g) ($[\alpha]_D^{22.5}= +20.1$, optical purity 96.3 % ee), dimethylaminopyridine (0.6 g) and triethylamine (1.7 g) in methylene chloride (50 ml) under ice-cooling. The mixture was left to stand at the room temperature for 24 hours before being poured in ice water. The methylene chloride layer separated was washed with diluted hydrochloric acid, water, 1N aqueous sodium carbonate solution and water in this order before being dried over magnesium sulfate. After distillation was over purification by toluene/silica gel chromatography and recrystallization from ethanol gave the titled compound (3.8 g).

(2) Synthesis of (R)-(+)-1,1,1-trifluoro-2-octyl 4-hydroxybenzoate

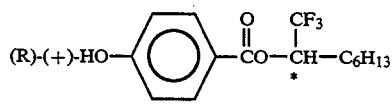

To a solution of the compound obtained in (1) above (3.8 g) in methanol (100 ml), was added 10% Pd on carbon (0.4 g). The mixture was subjected to hydrogenation in an atmosphere of hydrogen to obtain the titled compound (2.8 g).

(3) Synthesis of
(R)-(+)-4-(1,1,1-trifluoro-2-octyloxycarbonyl)phenyl 4'-n-octylbiphenyl-4-carboxylate (Titled compound)

After 4'-n-octylbiphenyl-4-carboxylic acid (3.2 g) and an excessive amount of thionyl chloride were heated under refluxing for 6 hours, unaltered thionyl chloride was distilled off to obtain 4'-n-octylbiphenyl-4-carboxylic acid chloride.

To a solution of (R)-(+)-1,1,1-trifluoro-2-octyl 4-hydroxybenzoate (2.8 g) obtained in (2) above, triethylamine (1.0 g) and dimethylaminopyridine (0.3 g) in methylene chloride (50 ml) was added under ice-cooling a solution of the acid chloride in methylene chloride (50 ml). The mixture was left to stand at the room temperature for 24 hours. The reaction product was poured in ice water. The methylene chloride layer separated was successively washed with diluted hydrochloric acid, water, 1N aqueous solution of sodium carbonate and water in this order, then dried over sodium sulfate and subjected to distillation to obtain the crude objective product, which was purified by toluene/silica gel chromatography to obtain the crude titled compound of (2.1 g), which was further purified by recrystallization from absolute ethanol. Phase transition temperatures of the resulting compound were as follows;

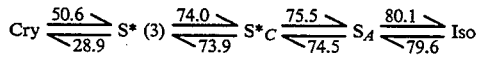

And optical purity of the compound is same as the one of the starting alcohol.

EXAMPLE 15

Synthesis of
(S)-(−)-(1,1,1-trifluoro-2-octyloxycarbonyl)phenyl 4'-n-octylbiphenyl-4-carboxylate

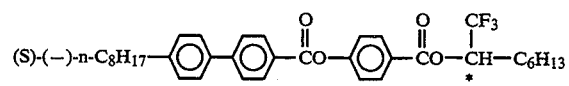

Example 14 was repeated except that (S)-(−)-1,1,1-trifluoro-2-octanol (2.9 g) ($[\alpha]_D^{22.5}= -23.2$, optical purity 94.9 % ee) was used in place of (R)-(+)-1,1,1-trifluoro-2-octanol.

Phase transition temperatures of the compound were as follows;

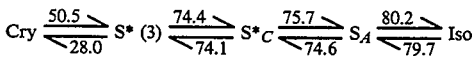

EXAMPLE 16

Phase transition temperatures and hysteresis curves of the compositions of the enatiomers of Examples 14–15.

The compound of Example 14, i.e. (R)-(+)-(1,1,1-trifluoro-2-octyloxycarbonyl)phenyl 4'-n-octylbiphenyl-4-carboxylate (hereinafter referred to as R-isomer), and the compound of Example 15, i.e. (S)-(−)-4-(1,1,1-trifluoro-2-octyloxycarbonyl)phenyl 4'-n-octylbiphenyl-4-carboxylate (hereinafter referred to as S-isomer), were blended as in Table 9. Phase transition temperatures of each blended composition were measured using a microscope with a hot stage and hysteresis curves were also measured with applying electric voltages of ±40V, 10 Hz at 50° C.

Hysteresis curves of the compositions were measured with the following apparatuses:

A polarizing optical microscope (OLYMPUS model BHSP)
A photo meter (SANKEI SPS-5A)
A photo cell (Hamamatsu R-636)
A high speed power Amplifier (NF 4005)
A digitizing osilloscope (YHP HP54501A)
A function generator (YHP HP3314A)
A hot stage (Metler FP82)
A central processor (Metler FP80)

Sample Preparation

Sample cells were constructed from two glass substrates with patterned ITO (indium-tin-oxide). The substrates were initially spin-coated with polyimides (LX500 produced by Hitachi Kasei Ltd.) and were then rubbed with nylon cloths on a rotating cylinder under several kinds of rubbing conditions. The sample cells were composed of two substrates thus processed, the rubbing directions of which were mutually parallel. The cell spacing was 1.6 μm. After the cell was filled with the compositions by capillary suction in the isotropic phase, it was cooled slowly (−0.1–1° C./min.) to the S*(3) phase.

Evaluation of Samples

Figure 6:
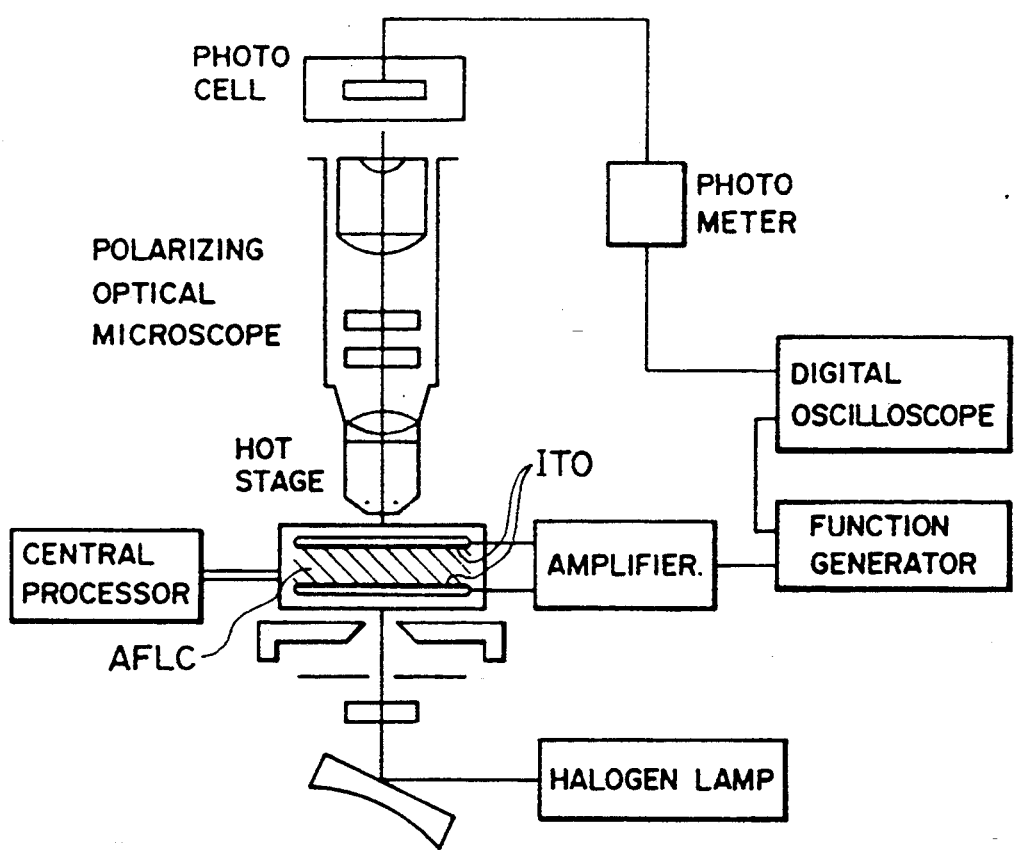
FIG. 6 shows an apparatus for measurement of electrooptical properties of liquid crystal compound.
Figure 7A:
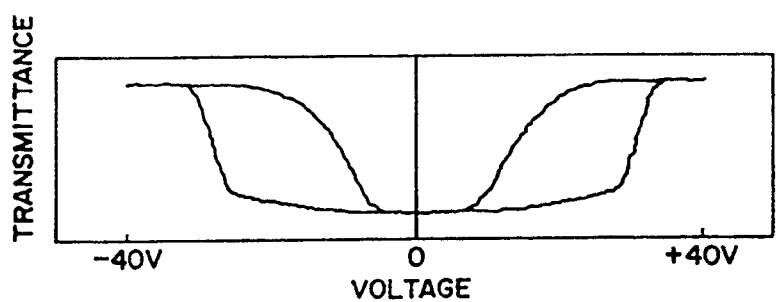
FIGS. 7A-7F show hysteresis curves of the compositions of (R)- and (S)-enantiomers obtained in Examples 14 and 15.
Figure 7B:
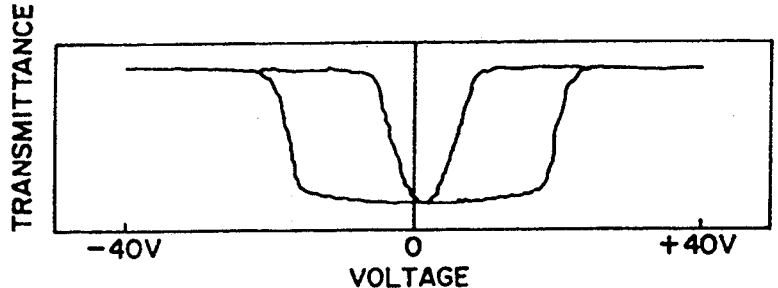
Figure 7C:
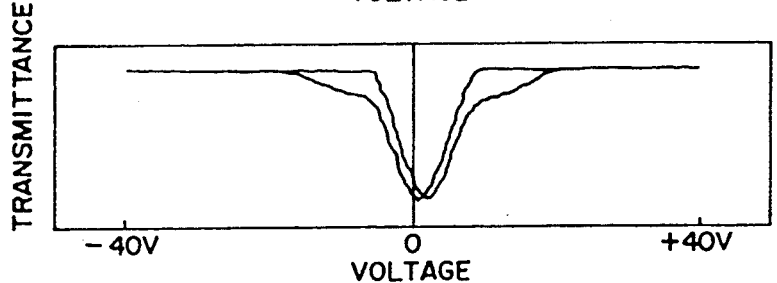
Figure 7D:
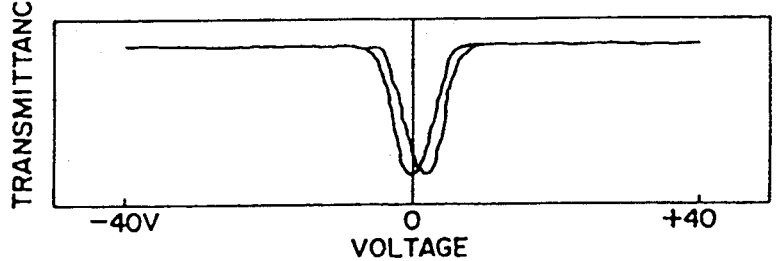
Figure 7E:
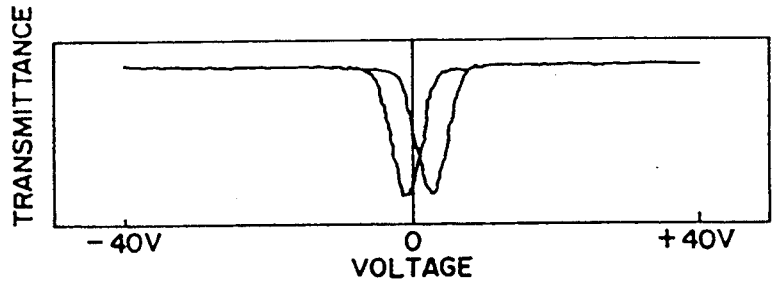
Figure 7F:
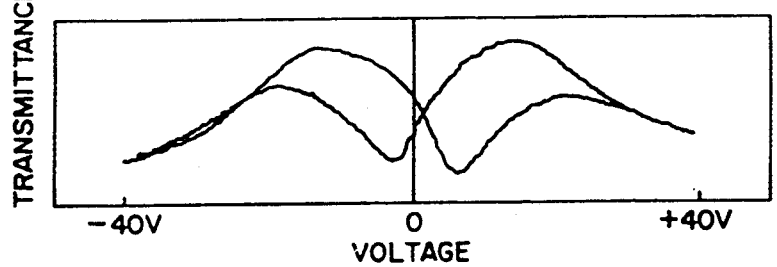

The orientation of the sample was observed under a polarizing microscope. In order to control the sample temperature, a hot stage (Mettler FP82) and a central processor (Mettler FP80) were used. The electrooptical properties were evaluated by the measurement system, as shown in FIG. 6. The light transmitted through the sample cell was detected by a photo cell. Pulses were synthesized in a function generator and were supplied to the sample cells through a bipolar amplifier.

The phase transition temperatures and hysteresis curves are shown in Table 9 and FIGS. 7A–7F, respectively.

Compositions in which R-isomer was 70–100% exhibited S*(3) phase and optically tristable states. And compositions in which (R)-isomer was 80–100% exhibited clear hysteresis.

TABLE 9

| Blend ratio % by weight | | Phase transition temperatures °C. (Cooling) | | | | Specific rotation $[\alpha]_D^{20}$ | Optical Purity % ee |
| --- | --- | --- | --- | --- | --- | --- | --- |
| (R)-isomer | (S)-isomer | Cry. ← | S*(3) ← | $S_C^*$ ← | $S_A$ ← Iso | | |
| 100 | 0 | 28.9 | 73.9 | 74.5 | 79.6 | 32.21 | 96.3 |
| 90 | 10 | <25 | 72.5 | 73.7 | 79.7 | 29.2 | 82.1 |
| 80 | 20 | <25 | 63.4 | 73.5 | 79.6 | 21.2 | 59.4 |
| 70 | 30 | <25 | no S*(3) | 73.9 | 79.9 | 18.4 | 51.6 |
| 60 | 40 | <25 | no S*(3) | 74.5 | 79.9 | 8.5 | 23.9 |
| 50 | 50 | <25 | no S*(3) | 73.9 | 79.6 | 0.19 | 0.03 |

We claim:

1. A composition of at least one of an (R)-isomer and (S)-isomer of a liquid crystal compound represented by the formula (I);

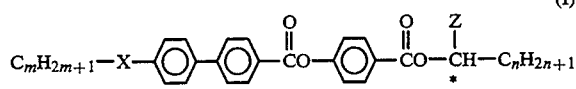

wherein X represents —O— or a direct bond, Z represents a halogen-substituted alkyl group selected from a group consisting of —$CF_3$, —$CHF_2$, —$CH_2F$, —$C_2F_5$, —$CClF_2$, —$CCl_2F$, —$CCl_2CF_3$, and —$C_3F_7$, m represents an integer of from 1 to 20, n represents an integer of from 1 to 20, and * represents an asymmetric carbon,
   wherein said composition is not a racemic mixture, and
   wherein the optical purity of said composition is high enough to exhibit optically tristable states in S*(3) phase in an electric field.

2. A composition according to claim 1, wherein X represents —O—.

3. A composition according to claim 1, wherein X represents a direct bond.

4. A composition according to claim 2, wherein Z represents —$CF_3$ or —$C_2F_5$.

5. A composition according to claim 3, wherein Z represents —$CF_3$ or —$C_2F_5$.

* * * * *